(12) United States Patent
Kanazawa

(10) Patent No.: US 10,017,158 B2
(45) Date of Patent: Jul. 10, 2018

(54) DATA EXCLUDING DEVICE

(71) Applicant: Yazaki Corporation, Tokyo (JP)

(72) Inventor: Akiyoshi Kanazawa, Susono (JP)

(73) Assignee: Yazaki Corporation, Tokyo (JP)

( * ) Notice: Subject to any disclaimer, the term of this patent is extended or adjusted under 35 U.S.C. 154(b) by 204 days.

(21) Appl. No.: 14/901,874

(22) PCT Filed: Jul. 17, 2014

(86) PCT No.: PCT/JP2014/069049
§ 371 (c)(1),
(2) Date: Dec. 29, 2015

(87) PCT Pub. No.: WO2015/008833
PCT Pub. Date: Jan. 22, 2015

(65) Prior Publication Data
US 2016/0368457 A1 Dec. 22, 2016

(30) Foreign Application Priority Data
Jul. 19, 2013 (JP) ................................. 2013-150623

(51) Int. Cl.
*G06F 13/20* (2006.01)
*G06F 11/00* (2006.01)
*B60R 25/30* (2013.01)
*H04L 12/413* (2006.01)
*H04L 29/08* (2006.01)
*B60R 25/24* (2013.01)
(Continued)

(52) U.S. Cl.
CPC ............ *B60R 25/307* (2013.01); *B60R 25/04* (2013.01); *B60R 25/24* (2013.01); *G06F 13/4282* (2013.01); *H04L 12/40* (2013.01); *H04L 12/4135* (2013.01); *H04L 67/12* (2013.01); *H04L 69/22* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS 8,737,426 B1 * 5/2014 Fredriksson .......... H04J 3/0602
370/464
2013/0227650 A1 8/2013 Miyake
(Continued)

FOREIGN PATENT DOCUMENTS

JP 2006-021598 A 1/2006
JP 2006-212093 A 8/2006

OTHER PUBLICATIONS

Marco Di Natale, "Understanding and using the Controller Area Network", Oct. 30, 2008.*

(Continued)

*Primary Examiner* — Hyun Nam
(74) *Attorney, Agent, or Firm* — Locke Lord LLP

(57) ABSTRACT

ECU 2 has a function for discarding data when continuous dominant equal to or greater than 6 bits is received during data reception. A data excluding device 5 is connected to a bus 3 to which the ECU 2 is connected. When ID of data received through the bus 3 matches ID of an illegal ECU detected by a theft sensor 4, the data excluding device 5 outputs 7 bits continuous dominant to the bus 3, and then stops output of the dominant.

2 Claims, 4 Drawing Sheets

(51) Int. Cl.
*B60R 25/04* (2013.01)
*G06F 13/42* (2006.01)
*H04L 12/40* (2006.01)
*H04L 29/06* (2006.01)

(56) References Cited

U.S. PATENT DOCUMENTS

2014/0250531 A1* 9/2014 Moeller .............. H04L 63/1425
726/23
2015/0291128 A1* 10/2015 Satake .................... B60R 25/34
340/5.65
2016/0259941 A1* 9/2016 Vasudevan ............ G06F 21/575

OTHER PUBLICATIONS

International Search Report dated Oct. 21, 2014, issued for PCT/JP2014/069049.

* cited by examiner

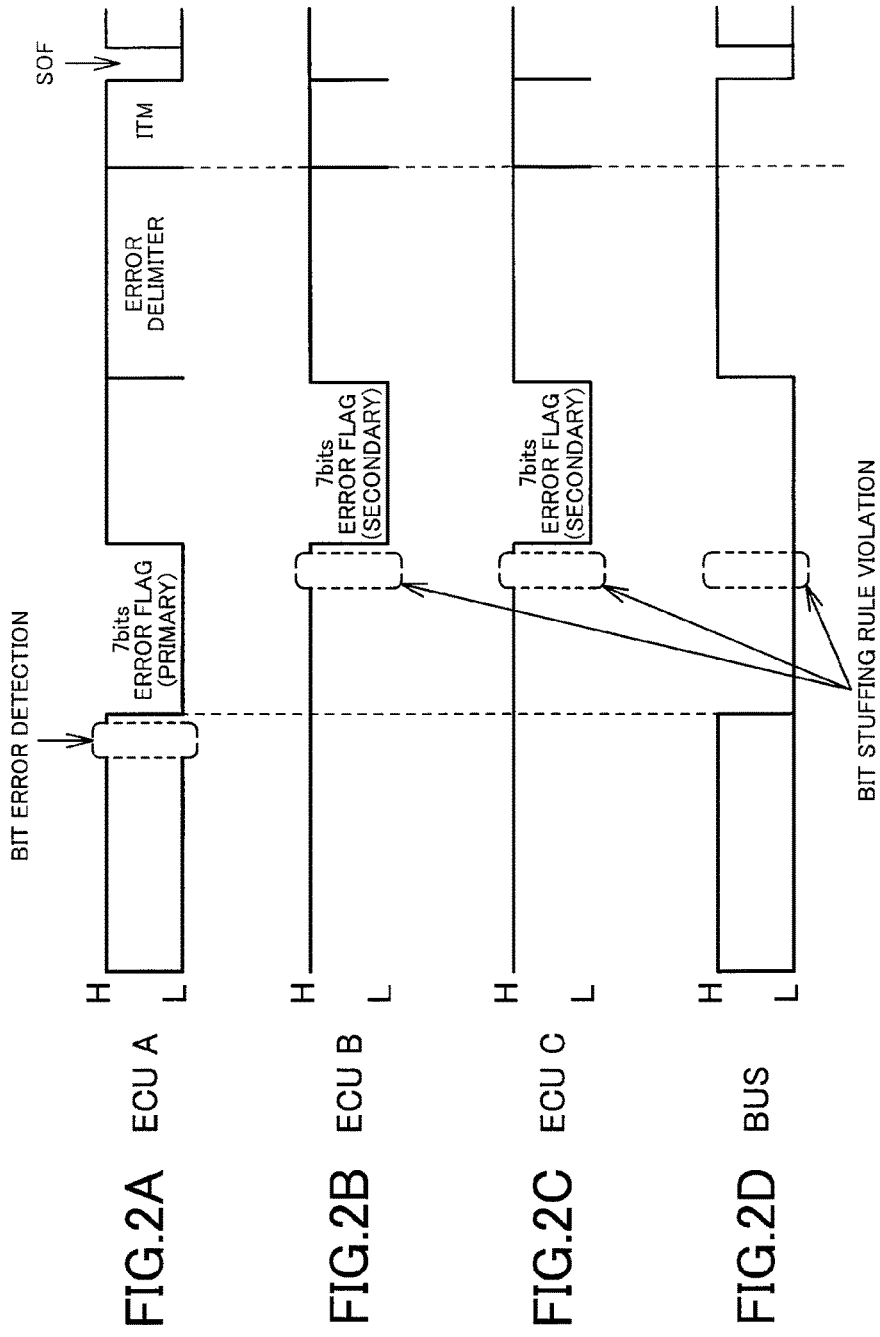

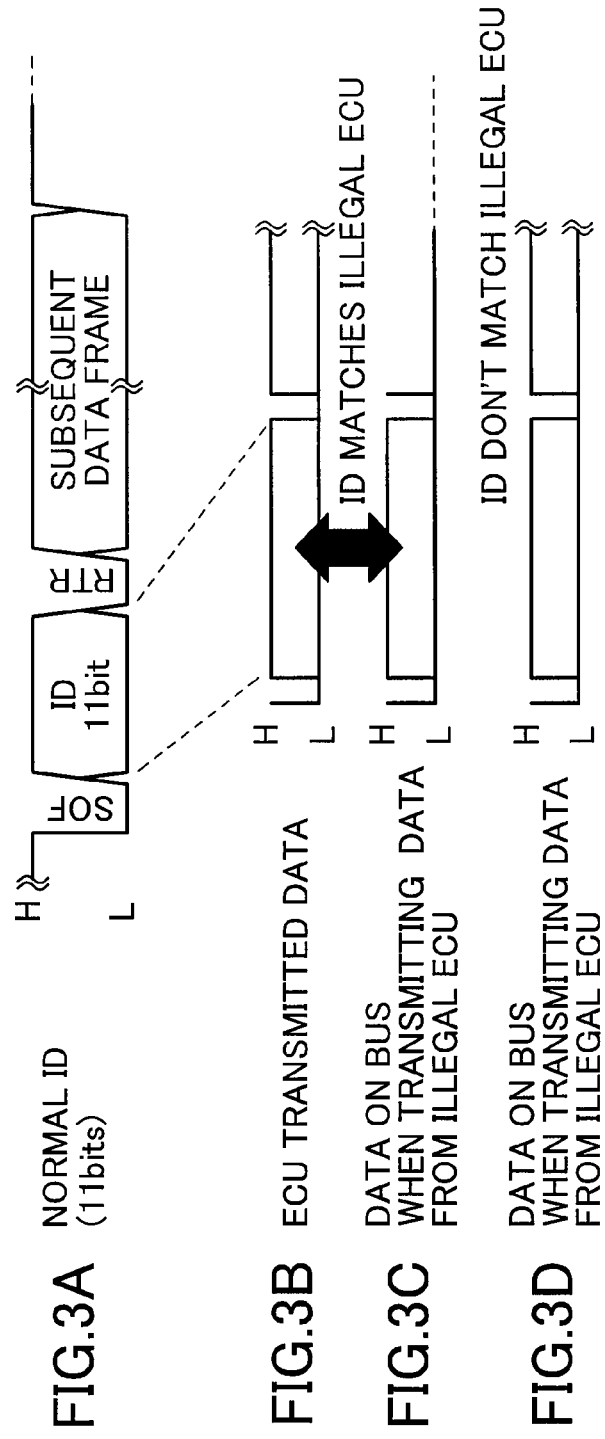

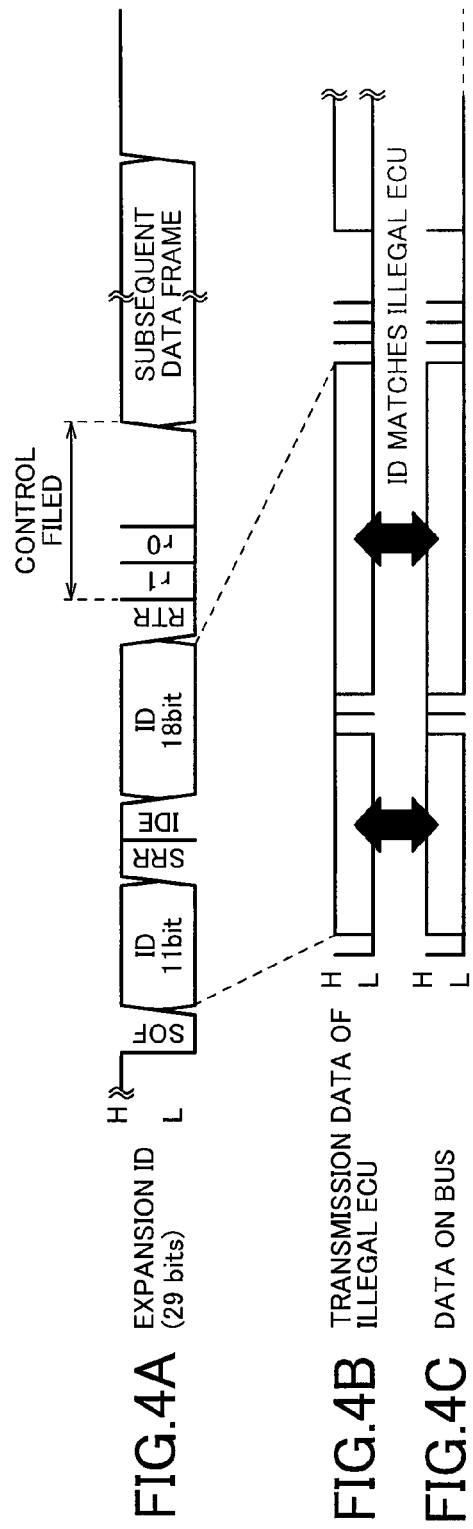

DATA EXCLUDING DEVICE

TECHNICAL FIELD

The present invention relates to a data excluding device, in particular, a data excluding device connected to a bus to which a plurality of nodes is connected.

BACKGROUND ART

Conventionally, as a purpose for preventing theft of a vehicle, for example, immobilizer function is mounted on a vehicle (For example, patent document 1). In the immobilizer function, an immobilizer ECU (=node) performs verification of an electronic key. When the electronic key is not matched with the authorized electronic key, starting of an engine is not performed.

CITATION LIST

Patent Literature

[PTL 1]
Patent Literature 1: JP 2006-21598A
[PTL 2]
Patent Literature 2: JP 2006-212093A

SUMMARY OF INVENTION

Technical Problem

However, recently as a purpose for stealing the vehicle on which the immobilizer function is mounted, act to allow operate the engine by replacing the immobilizer ECU or the engine ECU is rife. In other words, since the ECU itself is changed, engine control is performed as if the authorized ECU is operated. For this reason, it is impossible to prevent theft of the vehicle by the vehicle side, and the vehicle get stolen.

When the inside of the vehicle is illegally invaded as theft purpose, and an illegal ECU is mounted on the vehicle, it is impossible to prevent it. Further, it is possible to start the engine, and as a result the vehicle is stolen.

For this reason, when it is judged that the situation where the occurrence of the vehicle theft is presumed causes, bus failure is generated on network connecting a plurality of ECUs, and operation as a normal vehicle can not be performed (for example, patent document 2).

However, in this case, communication of all ECU is not available, and thereby a function which requires to maintain if security ECU etc. is not illegally exchanged is lost.

Solution to Problem

The present invention is to provide a data excluding device which can eliminate only communication with a particular node.

In one aspect, the present invention provides a data excluding device which connected to a bus connecting between a plurality of nodes having a function for discarding data when receiving continuous dominant equal to or greater than a prescribed bit during data reception. When ID of data received via the bus matches a specific ID, the data excluding device outputs the continuous dominant equal to or greater than the prescribed bit to the bus. Thereafter, the data excluding device stops outputting of the dominant.

In above configurations, when the ID of data received via the bus matches the specific ID, the data excluding device transmits RTR for distinguishing whether the data is a data frame or a remote frame for requesting to send the data frame, and subsequently outputs the continuous dominant equal to or greater than the prescribed bit to the bus.

Advantageous Effects of Invention

As described above, according to the present invention, when the ID of data received via the bus is a particular ID, the continuous dominant equal to or greater than the prescribed bit to the bus is output to the bus, and then the output of the dominant is stopped. For this reason, it is possible to eliminate only communication with a particular node.

According to the present invention, data from the particular node can surely be excluded.

BRIEF DESCRIPTION OF DRAWINGS

FIG. 2 is time charts showing an output state of ECU A to C and a state of a bus when error is detected at date transmission.

FIG. 3A is a drawing showing a frame construction of the head of data (normal frame) transmitted from the ECU.

FIG. 3B is a time chart of data transmitted from the ECU.

FIG. 3C is a time chart of data on the bus when the data shown in FIG. 3B is data from an illegal ECU.

FIG. 3D is a time chart of data on the bus when the data shown in FIG. 3B is data from the illegal ECU.

FIG. 4A is a drawing showing a frame construction of the head of data (expansion frame) transmitted from the ECU.

FIG. 4B is a time chart of data transmitted from the illegal ECU.

FIG. 4C is a time chart of data on the bus when the data from the illegal ECU is transmitted

DESCRIPTION OF EMBODIMENTS

Figure 1:
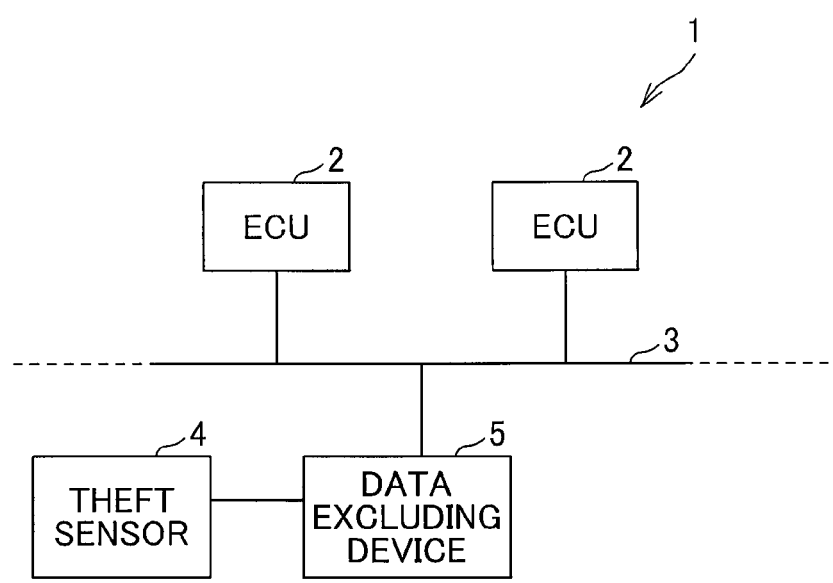
FIG. 1 is a drawing showing one embodiment of vehicle communication system mounted on a data excluding device of the preset invention.

Hereafter, a data excluding device of the present invention will be explained with reference to FIG. 1. FIG. 1 shows one embodiment of vehicle communication system incorporating the data excluding device of the present invention. As shown in FIG. 1, an in-vehicle communication system 1 is arranged in each part of a vehicle, and has a ECU 2 as a plurality of nodes for performing control of various electronic devices, a bus 3 communicatively bus-connecting to a plurality of ECUs 2, a theft sensor 4 for performing detect of illegal ECU illegally exchanged, and a data excluding device 5 which is connected to the bus 3 and eliminating data from the illegal ECU.

The above ECU 2 includes an immobilizer ECU for performing authentication of an electronic key, an engine ECU for performing control of engine, and so on, and performs CAN communication with each other. In those ECU 2, each different ID is assigned.

Next, CAN communication adopted with the embodiment of the present invention will be explained before explaining about the theft sensor 4 and the data excluding device 5 of the present invention. The above ECU 2 performs CAN communication each other by transmitting and receiving digital data consisting of H-level signal and L-level signal.

In the embodiment of the present invention, H-level signal is "recessive", and L-level signal is "dominant" For example, when the recessive and the dominant are simultaneously output from two ECUs, the dominant is the priority, an electrical potential of the bus 3 is the dominant, and the dominant is transmitted.

As shown in FIG. 3A, the head of data (standard format) transmitted from each ECU 2 is composed of a SOF, ID, RTR in this order from the head. The SOF is a part first transmitted when the data is transmitted from the ECU 2, and is the dominant (L). The ECU 2 of the receiving side can perform synchronization by changing from the recessive of bus idle to the dominant.

The ID includes ID assigned to each ECU 2 mentioned above. The RTR is to identify whether the data is a data frame or a remote frame for requesting transmission of the data frame.

In CAN communication, "bit stuffing rule" is adopted. The bit stuffing rule is intended to synchronize, and is a mechanism that one bit of a signal opposite to the transmitted signal is inserted when the same signal is continuous for example 6 bits on the bus 3.

The data excluding device 5 of the present invention eliminates data of illegal ECU using an error processing performed in this CAN communication. First, this error processing will be explained with reference to FIG. 2.

The ECU 2 performs operation as shown in FIG. 2 when an error is found during data transmission. FIGS. 2A to 2D are time charts showing an output state of ECU A to C and a state of the bus when an error is detected at the data transmission. In FIGS. 2A to 2D, the ECU A transmits data, and the ECUs B and C receive the data. When the ECU A detects a bit error during data transmission, the ECU A transmits an error flag (primary) of 7 bits continuous dominant (FIG. 2A).

When the other ECUs B and C receives the 7 bits (a prescribed bit) continuous dominant, they detects as a bit stuffing rule violation, transmits an error flag (secondary) of 7 bits continuous dominant, and eliminates the data received before now (FIGS. 2B and 2C). When the ECU A receives the error flag (secondary), it transmits an error delimiter and retransmits the data after completion of ITM (FIG. 2A).

Furthermore, if the ECU 2 detects an error when receiving data, the error flag (secondary) of 7 bits continuous dominant is output. The ECU 2 of the transmitting side transmits the error flan (secondary) of 7 bits continuous dominant as a form error that the bus is dominant even if data is output, and then retransmits data.

The theft sensor 4 is a sensor for detecting that each ECU 2 is illegally replaced, and outputs ID (=specific ID) of illegal ECU illegally replaced to a data excluding device 5. As a method for detecting an illegal replacement, for example, detecting that connection between the ECU 2 and the bus 3 is separated is considered.

Next, the data excluding device 5 will be explained. The data excluding device 5 consists of a non-volatile memory (not shown) in which ID of the illegal ECU is set, and a control circuit (not shown) for performing elimination of the ID of the illegal ECU. In the memory, ID of the illegal ECU from the theft sensor 4 is stored. Also, it is possible to set ID of the illegal ECU by using a resistor without using a memory. The control circuit may be composed of a predetermined logic circuit (hard circuit), microcomputer, or combination of them.

An operation of the in-vehicle communication system 1 will be explained with reference to FIG. 3. The data excluding device 5 monitors data on the bus 3. When the data excluding device 5 receives a SOF of data from the ECU 2 via the bus 3, it judges whether ID to be next transmitted matches ID of the illegal ECU stored in the memory or not. When ID to be next transmitted matches ID of the illegal ECU, the data excluding device 5 outputs 7 bits continuous dominant after RTR is output, and then stops output of dominant.

Thereby, as shown in FIG. 3C, a data frame after the RTR is not transmitted, and the 7 bits continuous dominant is transmitted. For this reason, in the ECU 2 of the receiving side, it is detected as a bit stuffing rule violation, the error flag (secondary) of 7 bits continuous dominant is transmitted as described in FIG. 2, and the data received up to now is discarded. As a result, since data from the illegal ECU is not received in the other ECU, engine does not started such as even if an immobilizer ECU or engine ECU is replaced. Furthermore, the other ECU 2 can be operated normally.

In the illegal ECU, since the bus 3 is dominant despite transmitting data, the error flag (secondary) of 7 bits continuous dominant is transmitted, and then data is retransmitted. For this reason, since the illegal ECU continues to retransmit data, there is a concern that communication of the other ECU 2 can not be performed. However, the ECU 2 in CAN communication counts the number of transmission of the error flag, is moved to an error-passive state when the number of transmission is equal to or greater than a predetermined number of times, and becomes in a transmission standby state. Thus, the illegal ECU becomes in a transmission standby state at the same time, and data transmission from the other ECU 2 is given priority. As a result, the above concern is resolved.

Further, in the above embodiment, when ID of data matches ID of the illegal ECU, the data excluding device 5 output dominant after RTR is transmitted. Thereby, it is possible to properly eliminate data from the illegal ECU.

Also, in the above embodiment, a case that data is normal frame is explained, but it is not limited thereto. As shown in FIG. 4, it can be applied to a case of expansion frame. Furthermore, as shown in FIG. 4, different portions between the normal frame and the expansion frame are parts from ID to RTR. In the expansion frame, 11 bits ID is transmitted after sending SOF in common with the normal frame. Then, SSR, IDE, and 18 bits ID are transmitted in order.

Furthermore, in the above embodiment, the data excluding device 5 outputs 7 bits dominant after transmitting RTR, but it is not limited thereto. As shown in FIG. 4, after transmitting RTR and then transmitting control filed, 7 bits successive dominant may be output. Additionally, after receiving ID, 7 bits successive dominant may be immediately output.

Further, in the above embodiment, the data excluding device 5 outputs 7 bits dominant when matching ID of the illegal ECU, but it is not limited thereto. A bit length of dominant is not limited to 7 bits. For example, a bit length of dominant may be a bit length such as a bit stuffing rule violation is detected.

Furthermore, in the above embodiment, the theft sensor 4 detects the illegal ECU, and only data of the illegal ECU is eliminated, but it is not limited thereto. For example, in a case that it is hardly possible that which ECU is replaced, when situations that it is suspect such as theft, for example, a big impact, entry into the vehicle, opening of the door and so on is detected, it is possible to eliminate only data of a specific ECU 2 such as immobilizer ECU, or engine ECU etc. from a plurality of ECUs.

Furthermore, according to the above embodiment, only data of the illegal ECU which is detected by the theft sensor 4 is excluded, but it is not limited thereto. According to the data excluding device 5 of the present invention, it is possible to eliminate only data from a specific ECU 2. For this reason, for example, it is considered that it is possible to exclude data from the ECU 2 transmitting data which is not to be delivered to the other party.

The illustrated embodiments of the present invention have been described for illustrative purposes only, and not by way of limiting the invention. Accordingly, the present invention can be implemented with various modifications made thereto within the scope of the present invention.

REFERENCE SIGNS LIST

2 ECU (node)
3 bus
5 data excluding device

The invention claimed is:

1. An in-vehicle communication system, comprising:
a data excluding device connected to a bus connecting a plurality of nodes; and
the plurality of nodes configured to discard data when receiving continuous dominant bits equal to or greater than a prescribed number during data reception,
wherein the data excluding device outputs the continuous dominant bits equal to or greater than the prescribed number to the bus when an ID of data received via the bus matches the specific ID; and subsequently stops outputting of the continuous dominant bits, and the data excluding device transmits RTR (Remote Transmission Request) for distinguishing whether the data denotes a data frame or a remote frame requesting to send the data frame when the ID of data received via the bus matches the specific ID, and subsequently outputs the continuous dominant bits equal to or greater than the prescribed number to the bus.

2. A data excluding method, comprising:
preparing a data excluding device connected to a bus connecting a plurality of nodes configured to discard data when receiving continuous dominant bits equal to or greater than a prescribed number during data reception;
outputting continuous dominant bits equal to or greater than a prescribed number to a bus from the data excluding device when an ID of data received in the data excluding device via the bus matches the specific ID; and
subsequently stopping outputting of the continuous dominant bits from the data excluding device; and
transmitting RTR (Remote Transmission Request) for distinguishing whether the data denotes a data frame or a remote frame requesting to send the data frame when the ID of data received via the bus matches the specific ID, and subsequently outputting the continuous dominant bits equal to or greater than the prescribed number to the bus.

* * * * *